Jan. 26, 1954
H. SHAW
2,666,947
APPARATUS FOR MANUFACTURING TUBULAR
ARTICLES BY EXTRUSION
Filed Nov. 8, 1950
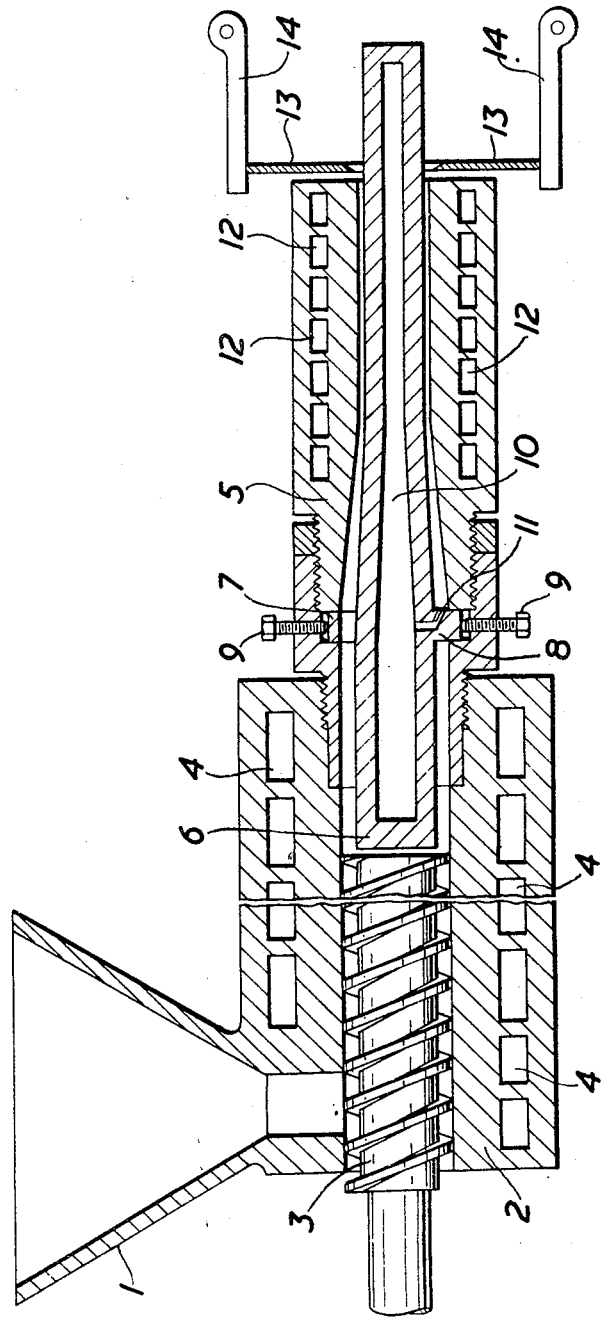
Inventor
HARRY SHAW
By *Frederick E. Harris*
Attorney Patented Jan. 26, 1954

2,666,947

UNITED STATES PATENT OFFICE 2,666,947

APPARATUS FOR MANUFACTURING TUBULAR ARTICLES BY EXTRUSION

Harry Shaw, Whitworth, Rochdale, England, assignor to Bitumex Limited, Rochdale, England, a British company Application November 8, 1950, Serial No. 194,590

2 Claims. (Cl. 18—14)

This invention relates to apparatus for the extrusion of pipes and other articles manufactured from fibrous materials in which a water-proof plastic has been incorporated.

The object of the present invention is to provide an apparatus by means of which articles such as pipes, troughs and other extrudable objects can be produced in continuous lengths.

It is well known to extrude thermoplastic material, with or without incorporated granular fillers, through shaped orifices for a variety of purposes. These thermoplastic materials and mixtures suffer from several disadvantages including brittleness in the finished product and poor resistance to moisture, besides being expensive to produce owing to slowness in manufacture. The softer thermoplastic materials though not brittle are insufficiently rigid for some purposes whilst the harder varieties though rigid are weak.

According to the present invention there is provided an apparatus for manufacturing a pipe or other extrudable article by extruding a composition composed of a mixture of fillers constituted by loose fibres and thermoplastic material through a suitably shaped orifice or die.

The fibrous material gives great strength and reinforces the thermoplastic material, which acts as a binder to impart high tensile and impact strength to the extruded product. A composition which has been found especially advantageous is composed of coal tar pitch containing free phenolic bodies in admixture with a tar-acid-aldehyde resin such as phenol-aldehyde or cresol-aldehyde resin containing an excess of aldehyde with the addition of the fibrous filler material such as cotton linters or asbestos fibres.

The characteristic governing the selection of the filler material is that it must be capable of withstanding the highest temperatures to which the composition is to be raised without being destroyed or unduly weakened.

The mixing is carried out under as low a temperature as it is possible to use commensurate with getting intimate mixing. During this mixing some of the free phenolic bodies combine with some of the excess aldehyde liberated as the phenol-aldehyde or cresol-aldehyde resin further condenses or reacts with the heat during mixing.

This combination of some of the free phenolic bodies and some excess aldehyde causes the melting point of the resultant mass to be raised.

Upon the material being subsequently heated for moulding purposes a further combination of more excess aldehyde with free phenolic bodies takes place, the amounts combining depending upon the temperature to which the material is heated, and the quantity that combines determines the extent to which the softening point is consequently raised.

By prolonged or repeated heating of the material its softening temperature can be very considerably raised.

By way of example only we give the following as a typical composition according to the invention.

100 parts by weight of hard gas works coal tar pitch are mixed with 20 parts by weight of crude tar acids, and into this is mixed 20 parts by weight of cresol-formaldehyde resin containing an excess of formaldehyde, the mass being intimately mixed at a temperature of 160° F. When thoroughly mixed 20 parts by weight of cotton fibre is mixed in and the mass cooled.

Later moulding can take place at a temperature of 160° F. to 180° F. but this moulding can later be subject to a temperature of 160° F. to 180° F. without softening to the same degree. If the moulding is subject to prolonged heating at say 180° F. it can later be raised to a temperature of 250° F. without appreciably softening.

If the mixing is carried out at a temperature of 250° F. for example and it is required to extrude the composition then its temperature must be raised to about 270° F. and the article so extruded must necessarily be heated to about 300° F. to soften it to the same extent.

Any well known plasticising agent such as for example hexamine tetramine may be added to the composition as necessary. Dyes or pigments may be added to the material to vary its natural colour as desired.

We find that moulding compositions manufactured in this manner have a softening point much higher and a much greater tensile strength than the coal tar pitch base and are of particular value for making objects impervious to moisture such as pipes, troughs and the like.

This prepared material is preferably formed into nodules or pellets since it can be satisfactorily stored in that condition.

In the manufacture of pipes or other articles these nodules or pellets are continuously fed to a heated chamber so that they are reduced to a plastic mass which is fed continuously from the chamber under pressure to shaped extrusion orifices. It is important that the material be fed at a condition of plasticity such that while it can be forced through the extrusion orifices with a minimum expenditure of power, it will solidify with sufficient rapidity to become sufficiently self supporting as not to collapse or become unduly distorted. This involves that the temperature of the mass in the extrusion apparatus should be thermostatically controlled and that an adequate cooling system must be provided beyond the extrusion orifice. This cooling can be effected either by air blast or by water cooling and in the case of pipes the best method of cooling we have found at present is to provide an external water jacket and an internal central water tube proceeding from the annular extrusion orifice so that the pipe is cooled equally from both its surfaces. By a combination of controlled plasticity and effective cooling a predetermined length of pipe, for example, can be delivered without undue distortion occurring and in the practical application of the invention a cutter will operate adjacent the extrusion nozzle to cut off the predetermined length of pipe.

One form of apparatus for extruding a mixture of fibrous fillers and thermoplastic material according to the invention in the form of a pipe is shown diagrammatically in the accompanying drawing.

The mixture of fibrous filler and thermoplastic material in the form of nodules or pellets is placed in a hopper 1 from which it is fed along a chamber 2 by means of a rotating screw 3. The chamber 2 is maintained at a temperature sufficient to soften the materials by means of oil filled jackets 4 supplied from motor driven pumps (not shown). At the delivery or extrusion end of the chamber 2 the mixture is forced into an annular space of progressively reduced diameter defined by an outer die 5 and an inner die or mandrel 6. This mandrel carries an annular ring 7 attached by webs 8 in order that the mandrel can be centralised by means of four screws 9 which extend radially through the outer die 5. The mandrel is formed with an internal axially extending chamber 10 containing oil which is supplied to the mixture through holes 11 in the webs 8. The outer die 5 is maintained at any desired temperatures along its length by means of oil jackets 12. The mixture, extruded in the form of a pipe is cut off into lengths by means of a pair of semi-annular co-operating knives 13 operated at intervals by levers 14. Means (not shown) may be provided for supporting the cut lengths of pipe and conveying them to a cooling point.

Although the drawing shows apparatus in which extrusion takes place in a horizontal direction such a pipe can be extruded vertically downwards or at an angle inclined to these directions provided it is supported and solidified sufficiently rapidly as to avoid distortion. Whilst the apparatus hereinbefore described is particularly suitable for the manufacture of pipes, it will be understood that it is equally applicable to the manufacture of other extrudable articles such as guttering or solid rods.

I claim:

1. Apparatus for manufacturing tubular articles by extrusion comprising a hopper for containing pellets of thermo-plastic composition, a feed screw to which the outlet from said hopper leads, a heated chamber through which said pellets of thermo-plastic composition are carried by said screw, means for heating said chamber to reduce said pellets to a plastic mass, a central mandrel protruding from the heating chamber, a heated die shaped to provide an annular passage of gradually decreasing cross-section through which the plastic material is forced to form a pipe and a cutter adjacent the forward end of said die surrounding a protruding end of said mandrel.

2. Apparatus for manufacturing tubular articles by extrusion comprising a pellet containing hopper, a feed screw to which pellets from the hopper pass, a heating jacket surrounding the feed screw, an annular extrusion passage of gradually decreasing cross section, a heated jacket surrounding said passage, a central heated mandrel co-operating with the heating jacket and protruding therefrom to form the annular extrusion passage and a cutter adjacent the end of the die passage embracing the protruding end of said mandrel.

HARRY SHAW.

References Cited in the file of this patent

UNITED STATES PATENTS

| Number | Name | Date |
|---|---|---|
| 1,944,464 | Richardson | Jan. 23, 1934 |
| 1,956,866 | Keller | May 1, 1934 |
| 2,168,288 | Fischer | Aug. 1, 1939 |
| 2,317,687 | Larchar | Apr. 27, 1943 |
| 2,501,995 | Dillehay | Mar. 28, 1950 |